United States Patent [19]

Fischer

[11] Patent Number: 5,311,591
[45] Date of Patent: May 10, 1994

[54] COMPUTER SYSTEM SECURITY METHOD AND APPARATUS FOR CREATING AND USING PROGRAM AUTHORIZATION INFORMATION DATA STRUCTURES

[76] Inventor: Addison M. Fischer, 60 14th Ave. South, Naples, Fla. 33942

[21] Appl. No.: 70,787

[22] Filed: Jun. 3, 1993

Related U.S. Application Data

[63] Continuation of Ser. No. 883,868, May 15, 1992, abandoned.

[51] Int. Cl.$^5$ ............................................... H04L 9/00
[52] U.S. Cl. .......................................................... 380/4
[58] Field of Search ............................................ 380/4

[56] References Cited

U.S. PATENT DOCUMENTS 5,005,200  4/1991  Fischer .
5,047,928  9/1991  Wiedemer ............................... 380/4
5,109,413  4/1992  Comerford et al. ..................... 380/4

FOREIGN PATENT DOCUMENTS 0026590  4/1981  European Pat. Off. .

OTHER PUBLICATIONS

Graham et al; "Protection–Principles and practice*", Proc. Spring Joing Comp. Conf., vol. 40, 1972, Atalantic City, U.S. pp. 417–439.
Proc. 9th International Conf. on Comp. Comm. Mar. 11, 1988, Tel Aviv, IL, pp. 391–396, Kowalski et al, "Security for Electronic Mail and Telematic Services".
IEEE Symposium on Security and Privacy, Apr. 1988, Oakland, US, pp. 39–49, Vinter et al, "Extended Discretionary Access Controls".

*Primary Examiner*—David C. Cain
*Attorney, Agent, or Firm*—Nixon & Vanderhye

[57] ABSTRACT

Method and apparatus are disclosed including a system monitor which limits the ability of a program about to be executed to the use of predefined resources (e.g., data files, disk writing capabilities, etc.). The system monitor processes a data structure including a set of authorities defining that which a program is permitted to do and/or that which the program is precluded from doing. The set of authorities and/or restrictions assigned to a program to be executed are referred to as "program authorization information" (or "PAI"). Once defined, the program authorization information is thereafter associated with at least one program to be executed to thereby delineate the resources and functions that the program is allowed to utilize and/or is not allowed to utilize. The PAI associated with a particular program may be assigned by a computer system owner/user or by someone who the computer system owner/user implicitly trusts. The PAI permits an associated program to access what has been authorized and nothing else. The program may be regarded as being placed in a program capability limiting "safety box". This "safety box" is thereafter associated with the program such that when the system monitor runs the program, the PAI for that program is likewise loaded and monitored. When the program is to perform a function or access a resource, the associated PAI is monitored to confirm that the operation is within the defined program limits. If the program is prevented from doing anything outside the authorized limits.

77 Claims, 10 Drawing Sheets

COMPUTER SYSTEM SECURITY METHOD AND APPARATUS FOR CREATING AND USING PROGRAM AUTHORIZATION INFORMATION DATA STRUCTURES

RELATED APPLICATION

This application is a continuation of the applicant's copending application Ser. No. 07/883,868 entitled "COMPUTER SYSTEM SECURITY METHOD AND APPARATUS HAVING PROGRAM AUTHORIZATION INFORMATION DATA STRUCTURES", filed May 15, 1992, now abandoned.

FIELD OF THE INVENTION

The present invention generally relates to a method and apparatus for providing digital information with enhanced security and protection. More particularly, the invention relates to a method and apparatus for providing enhanced computer system security while processing computer programs, particularly those of unknown origin, which are transmitted among users.

BACKGROUND AND SUMMARY OF THE INVENTION

The potentially devastating consequences of computer "viruses" have been widely publicized. A computer virus may be viewed as a computer program which, when executed, results in the performance of not only operations expected by the user, but also unexpected, often destructive, operations built into the program. A computer virus may also be viewed as a program which, when executed, takes a part of its code and places such code in other programs to thereby infect the other programs. The virus may modify other programs within the system, set various traps in the system, alter various control programs, erase or otherwise modify files in the system, etc.

Such a virus is typically maliciously constructed to have such undesirable side effects which damage, probe or compromise the user's data in unexpected ways. Problems with computer viruses are often compounded by the fact that the virus controlling program is typically executed "implicitly" when the user accesses certain necessary data so that the user is not even aware that the destructive program is executing.

The present invention provides protection from such viruses and also from programs which execute on a system but which are not actual computer virus carriers. In this regard, a program may have an unintended, adverse impact on a computer system and/or associated data. For example, an executing program may inadvertently cause certain user data to be sent to a third party. Such a program may have been the result of a programming error or may have been intentionally designed to cause a particular problem.

Prior art operating systems are typically designed to protect data from computer users. In such systems, users are often assigned various authorities and are thereafter able to execute programs based on their associated authority. If a program is executing which exceeds the user's assigned authority, then such a system will halt execution of the program. Such prior art systems do not adequately protect computer users from computer viruses or the like.

There are security systems which protect certain "system" related files from being modified by a program. However, such systems do not typically protect a computer user from a program executing and modifying the user's own files.

The present invention is directed to providing reliable security, even when operating with complex data structures, e.g., objects, containing their own program instructions, which are transmitted among users. The present invention also provides enhanced security when processing more conventional programs, even those of questionable origin, e.g., from a computer bulletin board, without exposing system programs or data to the potentially catastrophic consequences of computer viruses or of incompetent programming.

The present method and apparatus utilizes a unique operating system design that includes a system monitor which limits the ability of a program about to be executed to the use of predefined resources (e.g., data files, disk writing capabilities etc.). The system monitor builds a data structure including a set of authorities defining that which a program is permitted to do and/or that which the program is precluded from doing.

The set of authorities and/or restrictions assigned to a program to be executed are referred to herein as "program authorization information" (or "PAI"). Once defined, the program authorization information is thereafter associated with each program to be executed to thereby delineate the types of resources and functions that the program is allowed to utilize. The PAI associated with a particular program may be assigned by a computer system owner/user or by someone who the computer system owner/user implicitly trusts.

The PAI defines the range of operations that a program may execute and/or defines those operations that a program cannot perform. The program is permitted to access what has been authorized and nothing else. In this fashion, the program may be regarded as being placed in a program capability limiting "safety box". This "safety box" is thereafter associated with the program such that whenever the system monitor runs the program, the PAI for that program is likewise loaded and monitored. When the program is to perform a function or access a resource, the associated PAI is monitored to confirm that the operation is within the defined program limits. If the program attempts to do anything outside the authorized limits, then the program execution is halted.

Thus, the present invention advantageously protects a user from any program to be executed. The present invention is particularly advantageous in light of current data processing practices where programs are obtained from a wide range of diverse, untrustworthy places such as computer bulletin boards or other users of unknown trustworthiness.

The present invention contemplates that the above-described PAI may be, together with the program itself (or a hash of the program), digitally signed by some entity that the user trusts. When digital signatures are used to validate the PAI, the aforementioned PAI monitoring will also involve verifying a digital signature on a PAI to ensure that it belongs to an entity trusted by the user and that it is properly authorized and that it and the associated program have not been tampered with.

The present invention contemplates the use of the hierarchical trust digital signature certification systems such as that described in the inventor's U.S. Pat. Nos. 4,868,877 and 5,005,200 which patents are hereby incorporated by reference herein. In accordance with the teachings of these patents, it is possible for a single high level authorizing entity to securely delegate the authority to authorize programs among a number of other entities and to require co-signatures at any level, thereby inhibiting the possibility of error, fraud by the authorizing agents themselves. This allows a single software validation group to service a large population, thereby substantially reducing the per capita expense to each user.

In one contemplated embodiment of the present invention, programs may be part of data objects, which are written in a high-level control language and are executed by a standardized interpreter program which executes this high-level language. In this case, part of the interpreter's task is to verify that the functions encountered in the high level logic are, in fact, permissible. If such tasks are not permissible, the interpreter then suppresses the execution of the program not authorized to perform such tasks.

Many advantages flow from the use of the present invention. For example, the present invention advantageously serves to bind limitations to programs so that it becomes impossible for covert programs or viruses to be introduced into the system. Users are protected through specifying details as to the functions that may be performed to ensure that programs which are intended for one function do not accidentally or intentionally cross-over and affect other unrelated or critical resources (so as to effect the spread of computer viruses). Through the use of the program authorization information in the manner described herein, it is possible for users to protect themselves against the programs they execute.

Administrative agents can effectively limit the scope of programs without the need to comprehend every aspect of the program's logic. Administrators can authorize and limit programs based on their intended functions and definitions to thereby reduce the dangers of program defects. In this fashion, the dangers of the distraught or mischievous programmer who might try to plant a software "time bomb" or virus can be limited.

The present invention also permits digital signatures to verify the PAI. Thus, programs can be freely and safely exchanged within a large population, where all members trust the common high-level signing authority.

Even programs with no known trustworthiness can be used after program authorization information associates a wide range of restrictions to thereby allow potentially beneficial programs to be safely used—even if they do not have an official certification of trust.

The present invention also allows an unlimited number of different resources and functions to be controlled. For example, some useful resources/functions which may be controlled include: the ability to limit a program to certain files or data sets; the ability to transmit data via electronic mail to someone outside the user's domain; the ability of a program to create or solicit digital signatures; the ability to limit access to a program of certain security classes, etc.

The present invention also provides the ability to limit whether a program can perform digital signature operations and limit how such signatures must be performed. In many cases, when a program is involved in soliciting a digital signature from a user, it is up to the program to make the user aware of the data to which the signature is being applied. Such is likely to be the case with electronic data interchange (EDI) transactions. In this case, it is conceivable for a mischievous application program to show the user one set of data and yet feed another set of data for signature. In this case, the program has tricked the user into digitally signing totally different information than that which the user has been led to believe. The present invention provides a mechanism which protects the user from programs which solicit digital signatures.

Through the use of the present invention, general object oriented data may be transferred from user to user without exposing users to the potential dangers of viruses or mischievous users.

BRIEF DESCRIPTION OF THE DRAWINGS

These as well as other features of this invention will be better appreciated by reading the following description of the preferred embodiment of the present invention taken in conjunction with the accompanying drawings of which.

DETAILED DESCRIPTION OF THE DRAWINGS

Figure 1:
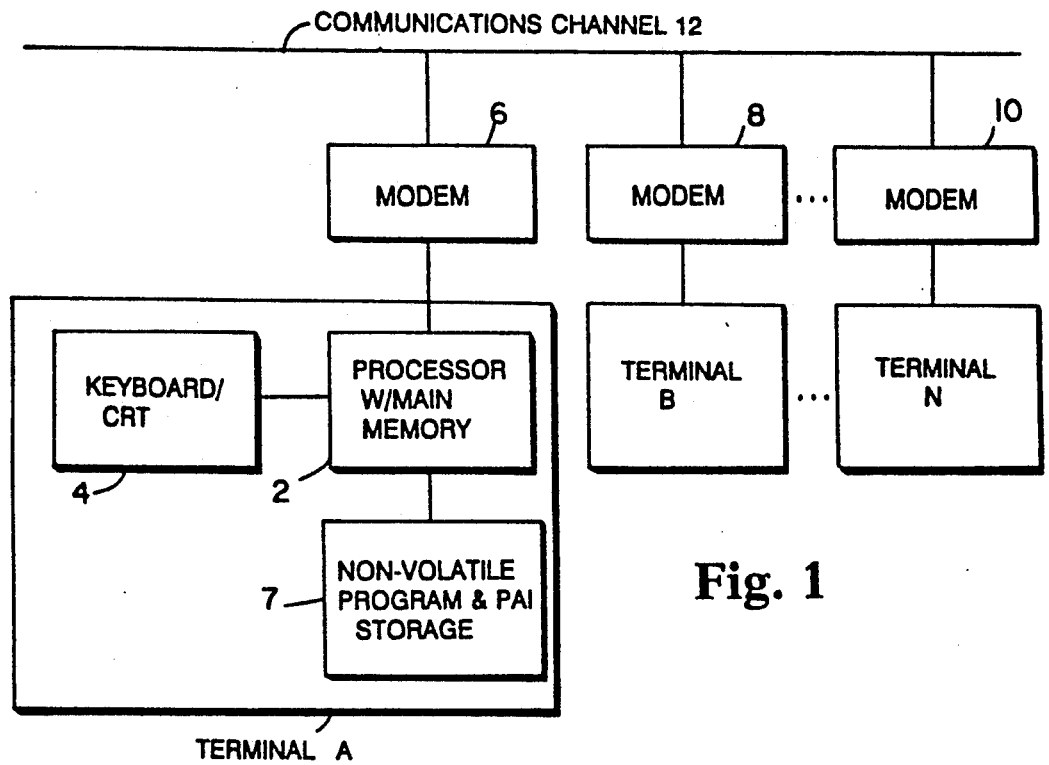
FIG. 1 shows in block diagram form an exemplary communications system which may be used in conjunction with the present invention.

FIG. 1 shows in block diagram form an exemplary communications system which may be used in conjunction with the present invention. The system includes a communications channel 12 which may, for example, be an unsecured channel over which communications between terminals A, B, ... N, may take place. Communications channel 12 may, for example, be a telephone line. Terminals, A, B, ... N may, by way of example only, be IBM PC's having a processor (with main memory) 2 which is coupled to a conventional keyboard/CRT display 4. Additionally, each processor is preferably coupled to a non-volatile program and program authorization information (PAI) storage 7 which may be a disk memory device. Each terminal, A, B ... N also includes a conventional IBM communications board (not shown) which when coupled to a conventional modem 6, 8, 10, respectively, permits the terminals to transmit and receive messages.

Each terminal is capable of generating a message performing whatever digital signature operations may be required and transmitting the message to any of the other terminals connected to communications channel 12 (or a communications network (not shown), which may be connected to communications channel 12). The terminals A, B ... N are also capable of performing signature verification on each message as required.

Figure 2:
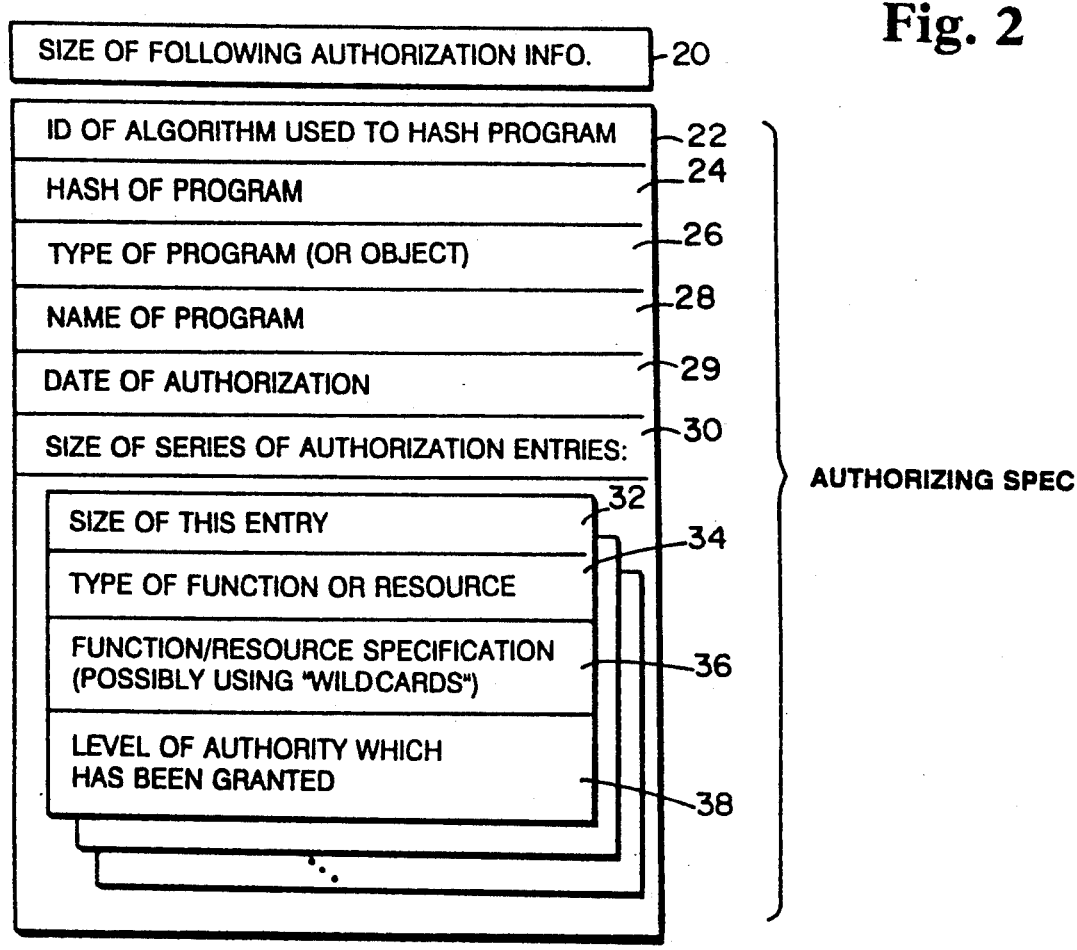
FIG. 2 is an illustration of a program authorization information data structure.
Figure 2:
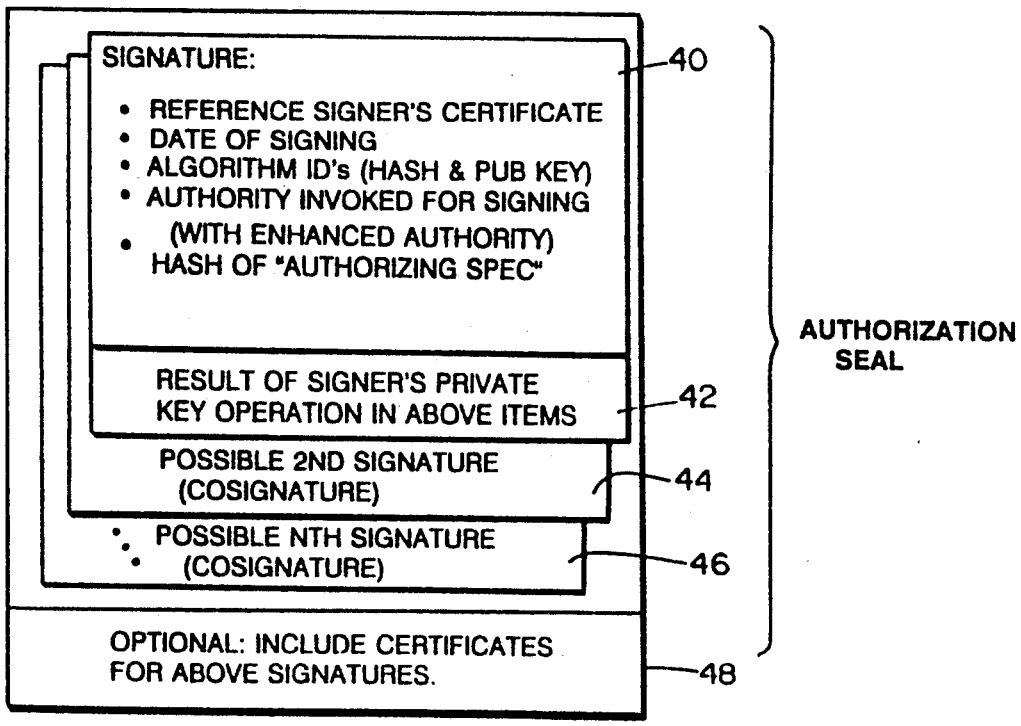

FIG. 2 is an illustration of an exemplary program authorization information (PAI) data structure. The PAI includes a set of authorizing specification segments 22-38 and a set of authorizing signature segments 40-48 (which may be optional in certain situations).

A header segment 20 precedes the authorizing specification segments, and defines the length of the program authorization information which follows. The field length information permits the programmer to readily determine the extent of the associated authorization information in memory. Thus, if, for example, an object-oriented data structure (to be described below in conjunction with FIG. 3C) were to be utilized, field 20 would serve to identify the point at which program authorization information segment 116 ends to locate program segment 118 shown in FIG. 3C.

Segments 22 and 24 are "hash" related segments. As will be appreciated by those skilled in the art, a "hash" is a "one-way" function in which it is computationally infeasible to find two data values which hash to the same value. For all practical purposes, the value obtained from applying the hashing function to the original aggregation of data is an unforgeable unique fingerprint of the original data. If the original data is changed in any manner, the hash of such modified data will likewise be different.

The hashing of related segments insures against the possibility that a properly authorized program in accordance with the present invention will be later tampered with to result in a modified program. By storing the program hash in segment 24, the hash may be later checked to insure that the associated program has not been modified after it has been authorized. In segment 22, an identifier is stored to uniquely identify a particular hashing algorithm.

The PAI may optionally include a segment 26 which identifies the type of program (or object) to, for example, indicate that the associated program is a machine language program, an executive program of a particular type, etc. By providing data identifying the type of program, the system is provided with some information regarding the nature of the operations to be performed by the program. Such information can provide an indication that something unexpected (and perhaps mischievous) is occurring. The PAI may also includes fields identifying the name of the program at the time it was signed (segment 28) and the data of authorization (segment 29).

Section 30 is a segment which defines the size of the following series of authorization related entries. This field allows the remaining entries to be delimited as desired.

Each authorization entry which follows includes a segment defining the size of the particular entry (32). Each entry likewise includes a segment 34 identifying the type of function or resource 34 to which it relates. A wide range of functions may be defined such as, for example, whether the program may have the right to authorize other programs to solicit digital signatures. Segment 36 specifies a specific function/resource falling within the generic type identified in segment 34. For example, specific user files may be designated in segment 36 to more specifically identify the "files" specified in segment 34. Segments 34 and 36 may, if desired, be combined in a single segment. The reference to "wild card" in segment 36 is intended to, for example, indicate that a program may access any file having a predetermined prefix or suffix. For example, a designation "A*" would indicate that the program may access any file identified by a tag beginning with "A". Similarly, the segment 36 may include an entry *DATA which may signify that the program may access any file ending with "DATA" or may alternatively signify that the program can not access the designated set of files. Such an entry may also indicate that the program can alter any program files. Segment 36 may thus specify not only what the program can do, but also what the program is not authorized to do.

Segment 38 shown in FIG. 2 specifies the level of authority which has been granted. For example, segment 38 may specify that the program is granted a level of authority permitting reading from a predetermined set of files, but is denied the authority to alter, or delete any such files.

If the PAI is to be made available to different users (by virtue of the program being transmitted to desired recipients), then it may become desirable for the PAI to be digitally signed. Even within a single organization, it may be desirable to include an optional authorization signature.

The authorization signature includes a signature segment 40. The signature segment 40 may include a reference to the signer's certificate, i.e., an identifier for identifying the signer's certificate. In accordance with a preferred embodiment of the present invention, such a digital certificate is a digital message created by a trusted entity which contains the user's public key and the name of the user (which is accurate to the entity's satisfaction) and possibly a representation of the authority which has been granted to the user by the party who signs the digital message. Such a signer's certificate is preferably created utilizing the teachings of the inventor's U.S. Pat. Nos. 4,868,877 and 5,005,200, which patents are hereby expressly incorporated herein by reference. In accordance with these patents, the certificate is constructed by the certifier to include the authority which is being granted and limitations and safeguards which are imposed including information which reflects issues of concern to the certifier, such as, for example, the monetary limit for the certifiee and the level of trust that is granted, to the certifiee. The certificate may also specify co-signature and counter signature requirements being imposed upon the certifiee, as specifically taught in the above-identified U.S. patents.

The signature segment 40 may also include the signing date, and algorithm identifiers for both the hash and public key. The segment 40 additionally includes the authority invoked for signing which specifies one or more authorities designated in a certificate to, for example, grant the authority to authorize programs to modify a predetermined file. Additionally, the signature will include a hash of the authorizing specification, e.g., including the entirety of segments 20 through 38 described above.

The result of the signer's private key operation on the items identified in segment 40 is stored in segment 42. This may be a standard digital signature such as defined in X.500 or may be in accordance with the enhanced digital signature teachings of the inventor's above-identified U.S. patents. Additional (a possible second to possible Nth) signatures (cosignatures) may be stored as indicated in segments 44, 46. Optionally, the authorization signature may also include the digital certificate for the above signatures in a segment 48. Alternatively, such certificates may be accessible from an identified data base (although it may be preferable to include the digital certificates for associated signatures so that signatures may be verified without the need to access any such data base). The segments 40 through 48 constitute the authorization seal which is associated with the authorization specification described above. All further details regarding the digital certification/digital signature techniques referenced herein may be performed with any digital signature technology including standard technology such as X.500 or enhanced technology such as in accordance with the above-identified U.S. patents.

In accordance with the present invention, a PAI is associated with programs to be executed. FIGS. 3A through 3D depict four exemplary approaches for associating program authorization information with a program. Turning first to FIG. 3A, this figure exemplifies how program authorization information is stored, under access control, in association with a program. FIG. 3A shows an exemplary schematic representation of a system's directory of programs. The directory includes data indicative of the name of each of the programs 1, 2, . . . N (80, 86 . . . 92, respectively).

Associated with each program name identifier is an indicator 82, 88, 94, respectively, which identifies the location on disk 98 of the associated program, for example, program 1 (104). Additionally, associated with each of the program related identifiers is an indicator 84, 90, . . . 96, respectively, which identifies the location of its associated program authorization information, e.g., PAI 1. Although the program authorization information, PAI 1, is depicted as being stored in a separate memory device 100, it may, if desired, be stored in the same memory media as its associated program. As indicated above, the program authorization information associated with a program may or may not be digitally signed depending upon whether the program authorization information has been generated by the user himself (in which case it may need not be signed) or has been generated by a third party in which case the PAI frequently should be signed.

Figure 3D:
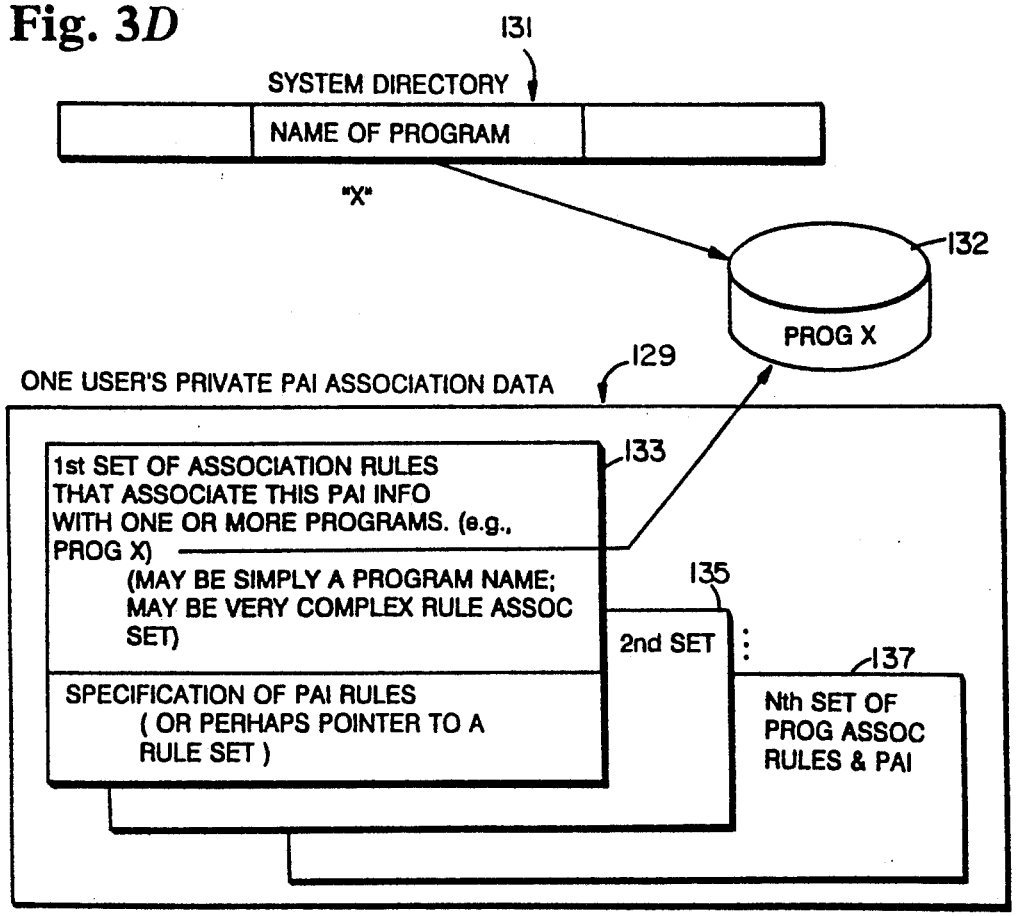
FIGS. 3A-3D illustrate exemplary methods for associating program authorization information with a program.
Figure 3A:
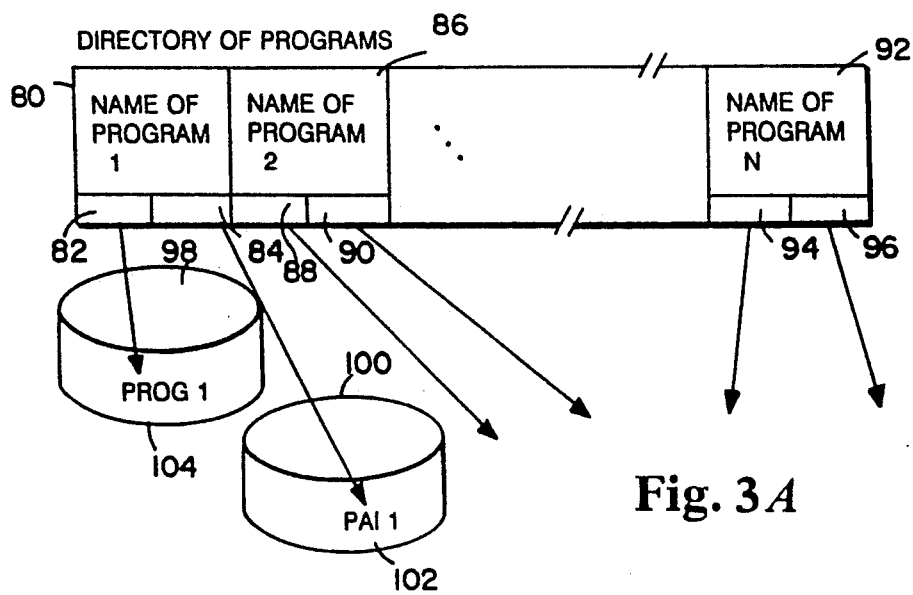
Figure 3B:
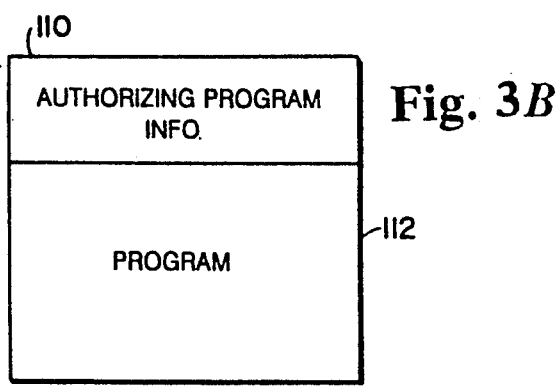

FIG. 3B shows another approach to associating a PAI with a program. In this approach, the program authorization information 110 is embedded with a program 112. As described above in conjunction with FIG. 3A, the authorizing information may optionally be digitally signed depending upon the source of the PAI.

Figure 3C:
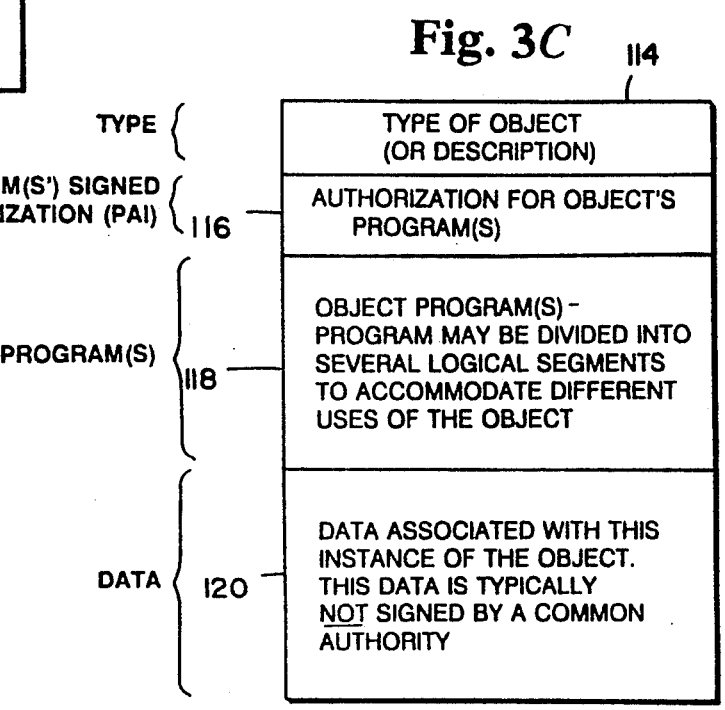

FIG. 3C shows an important application in which a PAI data structure is associated with a program according to an embodiment of the present invention. FIG. 3C shows an illustrative data structure for a secure exchangeable "object". The data structure may be signed by a trusted authority. The signing of such a data structure allows the object to be securely transmitted from user to user. Although the data structure shown in FIG. 3 is set forth in a general format, it may be structured as set forth in the inventor's copending application filed on Apr. 6, 1992 and entitled "Method and Apparatus for Creating, Supporting and Processing a Travelling Program" (U.S. Ser. No. 07/863,552, which application is hereby expressly incorporated herein by reference.

The data structure includes a header segment 114 which, by way of example only, may define the type of object that follows, e.g., a purchase order related object or any other type of electronic digital object. The program authorization information is embedded in a segment 116 which specifies the authorization for the object's program or programs in a manner to be described more fully hereinafter.

The data structure includes an object program(s) segment 118, which for example, may control the manner in which an associated purchase order is displayed so as to leave blanks for variable fields which are interactively completed by the program user. The object program might store such data and send a copy of itself together with accompanying data in a manner which is described in detail in the applicant's above-identified copending application. As indicated in FIG. 3C, the program may be divided into several logical segments to accommodate different uses of the object. For example, the program may present a different display to the creator of a digital purchase order, than it displays to subsequent recipients. When the program is received by a recipient designated by the program, the recipient invokes a copy of the transmitted program to, for example, control the display of the purchase order tailored to the needs of the recipient. The recipient may verify all received data and add new data and the program may then send itself via the recipient's electronic mail system to, for example, a user who will actually ship the goods purchased.

The data structure shown in FIG. 3C additionally includes data segments 120 associated with the object which include a "variables" segment and data files segment, preferably as described in the above-identified patent application. The data segment 120 may be partitioned such that data associated with each version or instance of the object will be separately stored and separately accessible, since different users may have different uses for the data structure shown in FIG. 3C. Therefore, the data will vary depending upon how it is collected from each user. The program 118, however, will preferably remain intact for each user. The trusted authority will sign the program together with the program authorization information (PAI) since it is the program itself which needs to be authorized rather than the data that is input in response to each execution of the program (since the data may change during each execution path and also since it is the program's responsibility to ensure that accurate digital signatures are properly collected on the input data).

FIG. 3D exemplifies a situation in which many users access the same program (image)—each having their own (possibly distinct) Program Authorization Information 129 associated with it and maintained in a specific file belonging to the user. FIG. 3D shows a system program directory 131, which identifies via an indicator associated with a program name, the location on a disk 132 of a program X. In this case, whenever program X is invoked by a user, the system checks to determine if the user has private PAI specification(s) (e.g., 133, 135, 137) that can be associated with that program. Thus, different users may limit a program according to their own needs and perception of trust. This can be useful, for example, when users with great inherent authority, or who have been granted access to very important information, must occasionally execute "pedestrian" programs for mundane purposes. In this case, it may be prudent for such critical users to define a "safety box" around some (or many, or all) "pedestrian" programs, so that such programs may not inadvertently contain "trojan horses" or other faults which might affect their own especially critical data.

Therefore, such users could define general PAI "association", so that a protecting PAI could be automatically associated with all programs—except perhaps the select trusted few programs which handle crucial data.

The present invention allows PAI information to be associated in any appropriate manner, so that in principle a user could define one or more levels of PAI which are then combined together with perhaps a more universal PAI, or with a PAI which was signed and supplied by the or manufacturer of this program.

The present invention contemplates that the association between a program and its PAI can be constructed very generally so that, if necessary, one program could be associated with multiple PAI's, or conversely, that one PAI could be applied to multiple programs; or some combination of these approaches. It therefore should be understood that, while for purposes of simplicity we generally discuss a single PAI in conjunction with a single program, this should not be considered in any way limiting.

Figure 4:
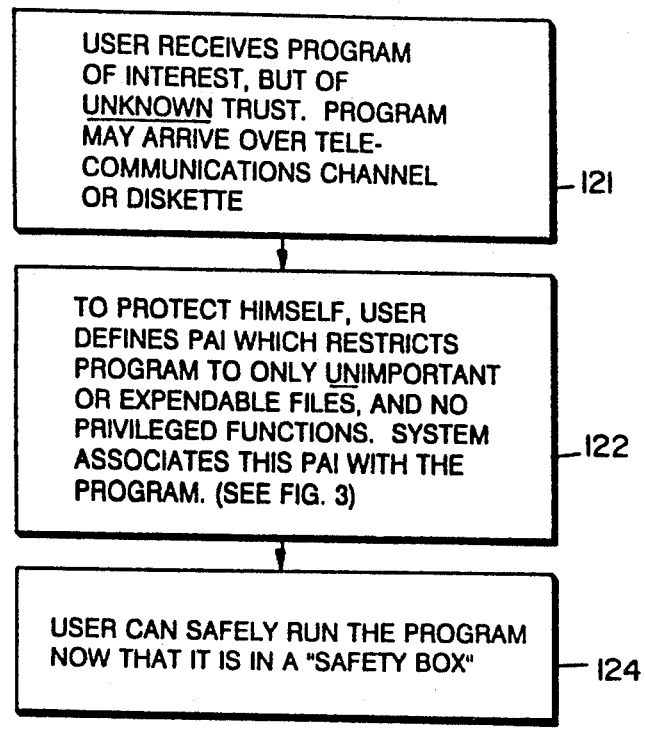
FIG. 4 is a general flowchart illustrating how a user may use the present invention in conjunction with a program of unknown origin.

FIG. 4 is a flowchart which illustrates how a user may benefit from the use of program authorization information, particularly when executing a program of unknown trustworthiness. As indicated in block 121, a user may have a desire to execute a program of interest in which the user has no knowledge of the program's creator. Thus, the program has unknown trustworthiness and may, for example, have been accessed via an electronic bulletin board and may have arrived at the user's terminal via a telecommunications channel or diskette. Such a program, which might purport to be only a game, carries with it a significant risk that it may be infected by a virus.

As indicated in block 122, the user may be protected by defining program authorization information which restricts the program to only unimportant or expendable files. If desired, the user may restrict such a program from modifying any files whatsoever. For example, the user may permit the program to only display images on the display screen and to perform game playing related functions. Alternatively, if the program is known to have a single work file, the PAI data may only permit use of such a single file. By limiting access only to a single work file, a program of unknown trustworthiness, cannot inject a virus into other user's programs or otherwise initiate system program malfunctions. Thus, in accordance with the present invention, a user, via a systems program, determines how much of the user's system will be put at risk by such a program so as to, for example, completely eliminate the ability of the program to use any privileged functions. The user then associates, for example, through an operator prompting, menu-driven system, a PAI with every program to be run on the system (or have such PAI or lack of PAI associated through predetermined default mechanisms). A system utility program is preferably employed to create the program authorization information in a manner which will be described in detail below in conjunction with FIGS. 6–9.

After the PAI has been assigned, any time the system runs the associated program, the system software (in a manner to be described below) insures that the program safely runs in a manner consistent with the PAI. Thus, the program has been effectively placed in a "safety box" (124).

Turning back to FIG. 1, a program of unknown trust may be injected into the system via communications channel 12 or from a floppy disk loaded into terminal A. The program may be initially stored in, for example, the user's program disk memory 7. Thereafter, the user on keyboard 4 will, through interaction with the system's program identified above (with respect to block 122 of FIG. 4), associate the program authorization information with a program (in a manner such as shown in FIGS. 3A through 3D) such that the program may safely run on the user's system or perhaps, a PAI arrives with the program, in which case it is likely to be signed.

Figure 5:
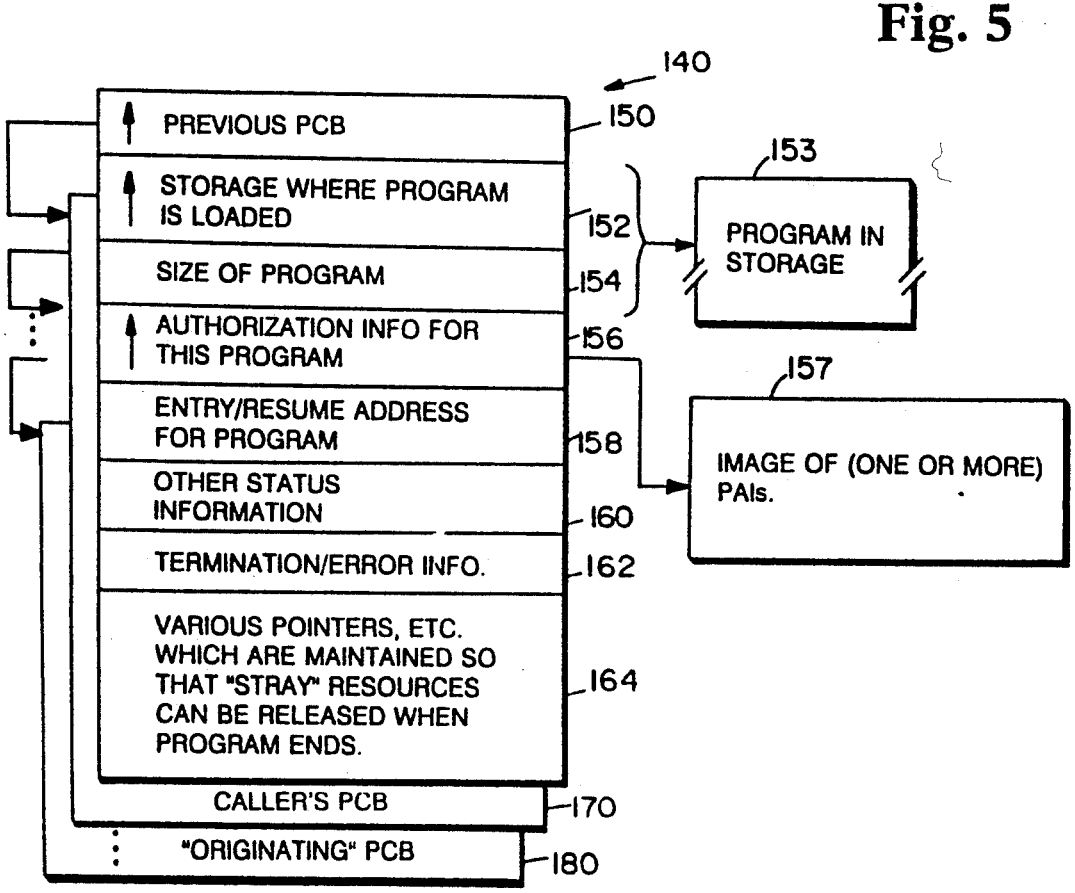
FIG. 5 is an illustration of a program control block data structure in accordance with an exemplary embodiment of the present invention.

FIG. 5 is an illustration of a program control block (PCB) data structure 140 in accordance with an exemplary embodiment of the present invention. The program control block 140 is the data structure utilized by the system monitor to control the execution of an associated program.

The program control block 140 is loaded with program authorization information such that the PAI can be readily referenced as the associated program is executed so as to insure that the program performs functions and accesses resources in conformance with its assigned authorizations. The program control block associated with the program to be executed is located in a storage area which cannot be modified by the program.

As shown in FIG. 5, an originating program (whose PCB is identified at 180) calls a program (having a PCB 170) which will, in turn, will call the program 140 is shown in detail in FIG. 5. Each new PCB will include a field such as 150 that points to the "previous" or calling program control block. A field may also be utilized to identify the "next" program control block file.

When a called program finishes executing, the system removes its associated PCB from the top of the executed stack, removes the associated program from storage, removes the associated authorizing information and accesses the program control block immediately below it in the stack. When another program is called, the reverse process occurs such that a new PCB is created which is placed on top of the stack, which again points to the previous PCB as indicated in field 150.

The program control block also includes a field 152 which is a pointer to the location in storage where the associated program is loaded, e.g., as indicated by memory segment 153, shown in FIG. 5. Additionally, the size of the program is indicated in field 154 (which thus indicates the amount of storage which will be released when the program finishes execution).

A field 156 of the program control block identifies the location in storage (157) of one or more PAI's (which are located in an area of storage which cannot be altered by associated programs). The PAI's pointed to by field 156 are preferably structured in the manner indicated in FIG. 2 described above.

Field 158 identifies the entry address for the associated program. If the program, during its execution, calls another program, the field 158 is utilized to store the address at which program execution will be resumed, after the called program completes is execution.

The program control block also includes a set of locations (160) for storing status information such as, for example, program status words (PSW's), stack information, etc. The program control block additionally includes a field 162 for storing information relating to an error or termination message if an error occurs during the execution of the program. Such a field may be available to the calling program to identify, for example, why the program terminated unsuccessfully. Field 162 may store an indication that the program successfully terminated.

The program control block 140 additionally includes various pointers which are maintained so that stray resources can be released when the program ends (164).

Such pointers are useful to permit the release of resources which, for example, a programmer neglects to release.

FIGS. 6 through 9 is a flowchart illustrating an exemplary sequence of operations of a utility program for establishing program authorization information. Such a utility program prompts a user, i.e., the end user, the end user's agent, or even the manufacturer, to define a range of authorities which are associated with a program to be executed by the user's system.

Figure 6:
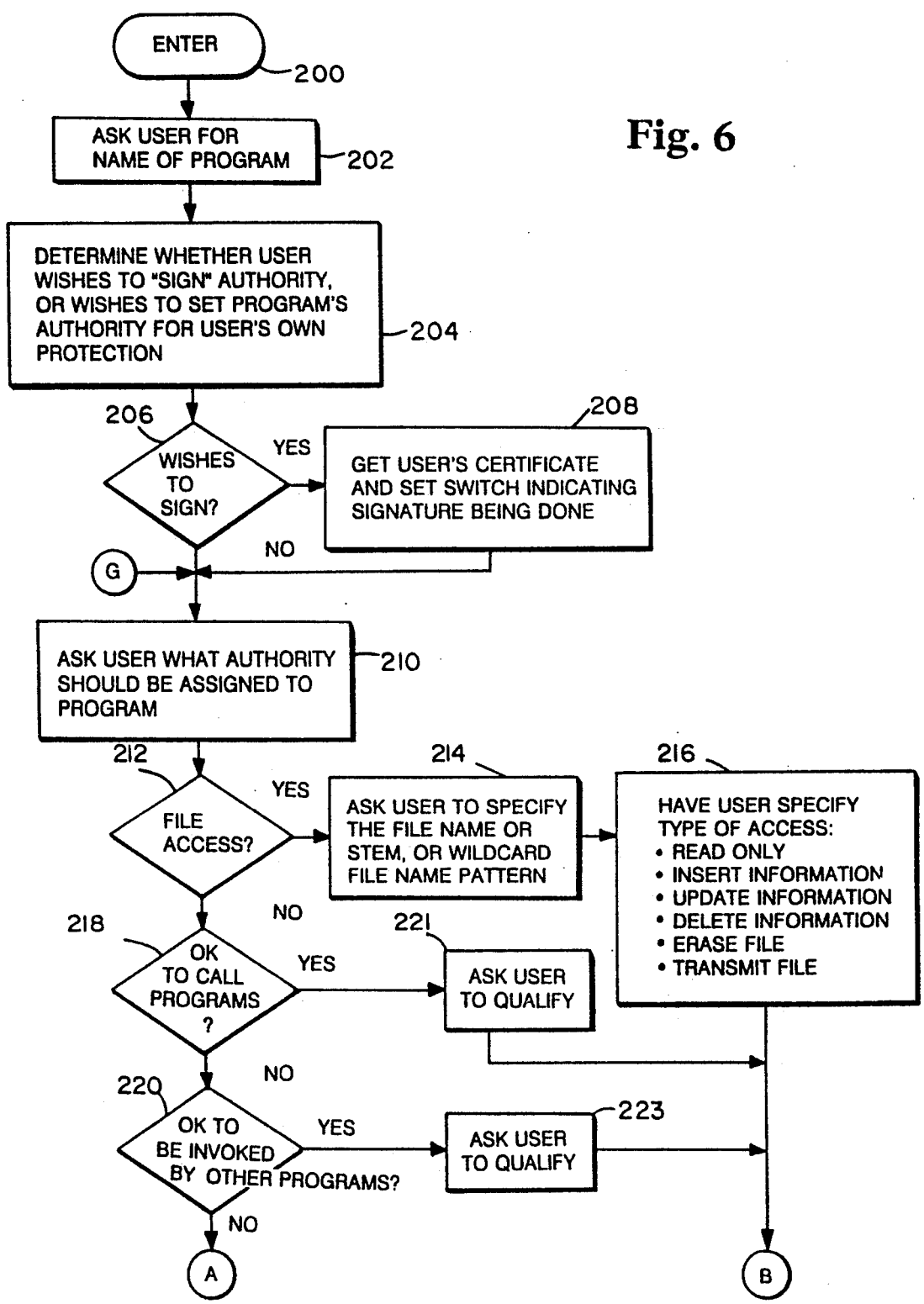
FIGS. 6, 7, 8, 9A and 9B are a flowchart delineating the sequence of operations of a program for establishing program authorization information.

As shown in FIG. 6, after entering the utility program for establishing the PAI (200), the user is prompted to supply the name of the program for which the PAI is to be established (202). Thereafter, the user is prompted to determine whether the PAI should be signed or not signed. The PAI need not necessarily be signed if the PAI is for the user's own use and protection or if this PAI can be stored under satisfactory access control. Depending upon the user's input in block 204, a determination is made (206) as to whether the user wishes to sign or does not wish to sign. If the user wishes to sign, then as indicated in block 208, a user's certificate is retrieved and a flag is set for later testing to indicate that a signature operation is being performed. The user's certificate may be a conventional digital certificate or an enhanced digital certificate providing for the delegation of authority in accordance with the inventor's U.S. Pat. Nos. 4,868,877 and 5,005,200.

As indicated in block 210, the user is then prompted to designate what authority should be assigned to the program. It should be recognized that the authorities which follow (and the order in which they are presented) are provided for illustration purposes only and are not intended to be a complete list of all possible authorities which may be assigned in accordance with the present invention.

As illustrated in FIG. 6, a check is made to determine whether file access authority is to be invoked (212). A menu may be displayed to the user to provide for a selection of a file access authority (and each of the other authorities hereinafter referenced). It should be recognized that file access authority may be used to indicate authority with respect to any set of fields or file elements in a file, any set of data or data elements, or any set of files, etc. If the user selects file access authority, then the user will be prompted to specify a file name or a file stem or "wild card" file name pattern (214). As explained above, for example, a wild card file name pattern may be selected of the form DATA*, such that the program will be given the authority to access any file name beginning with the prefix "DATA".

Figure 7:
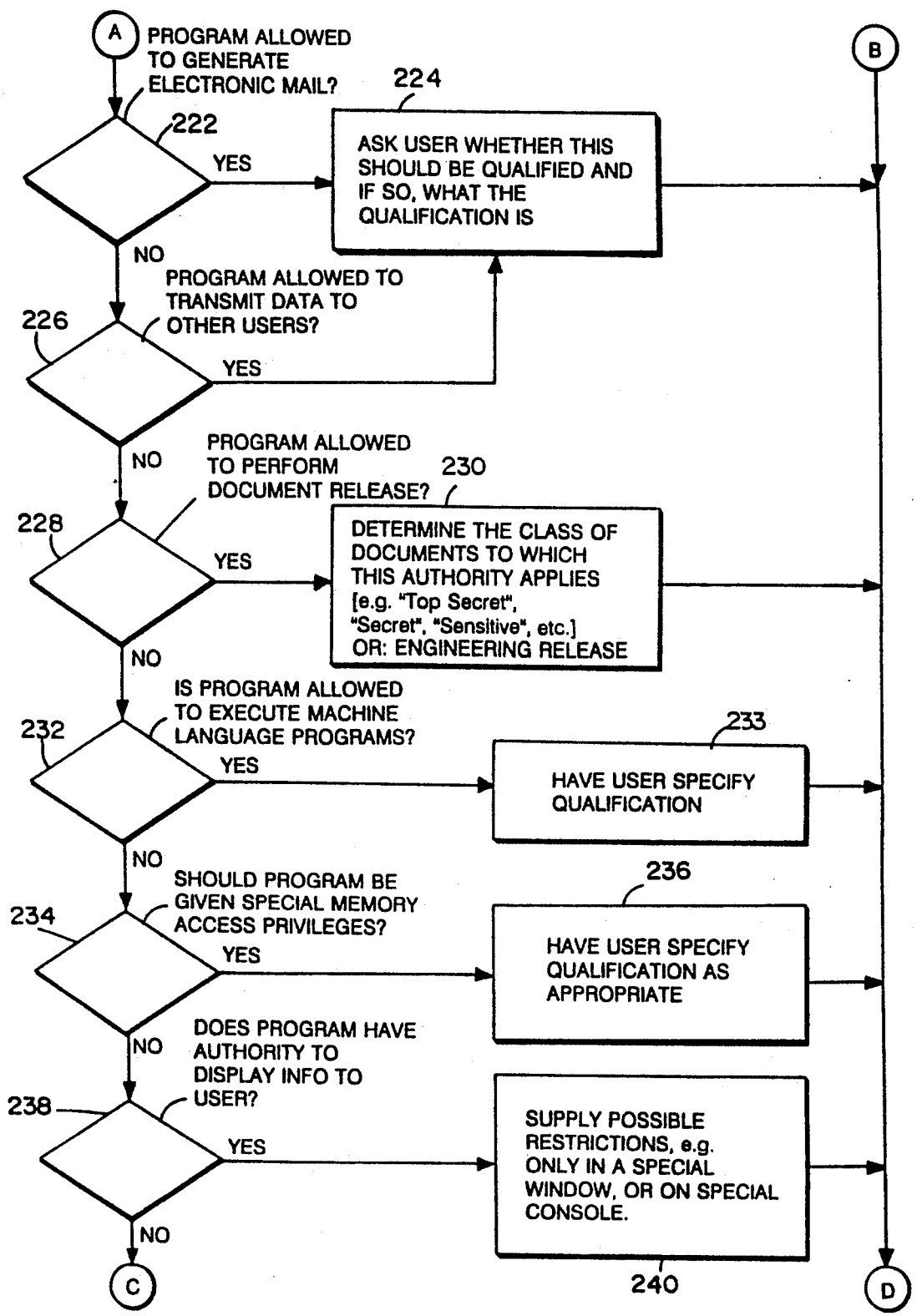
Figure 8:
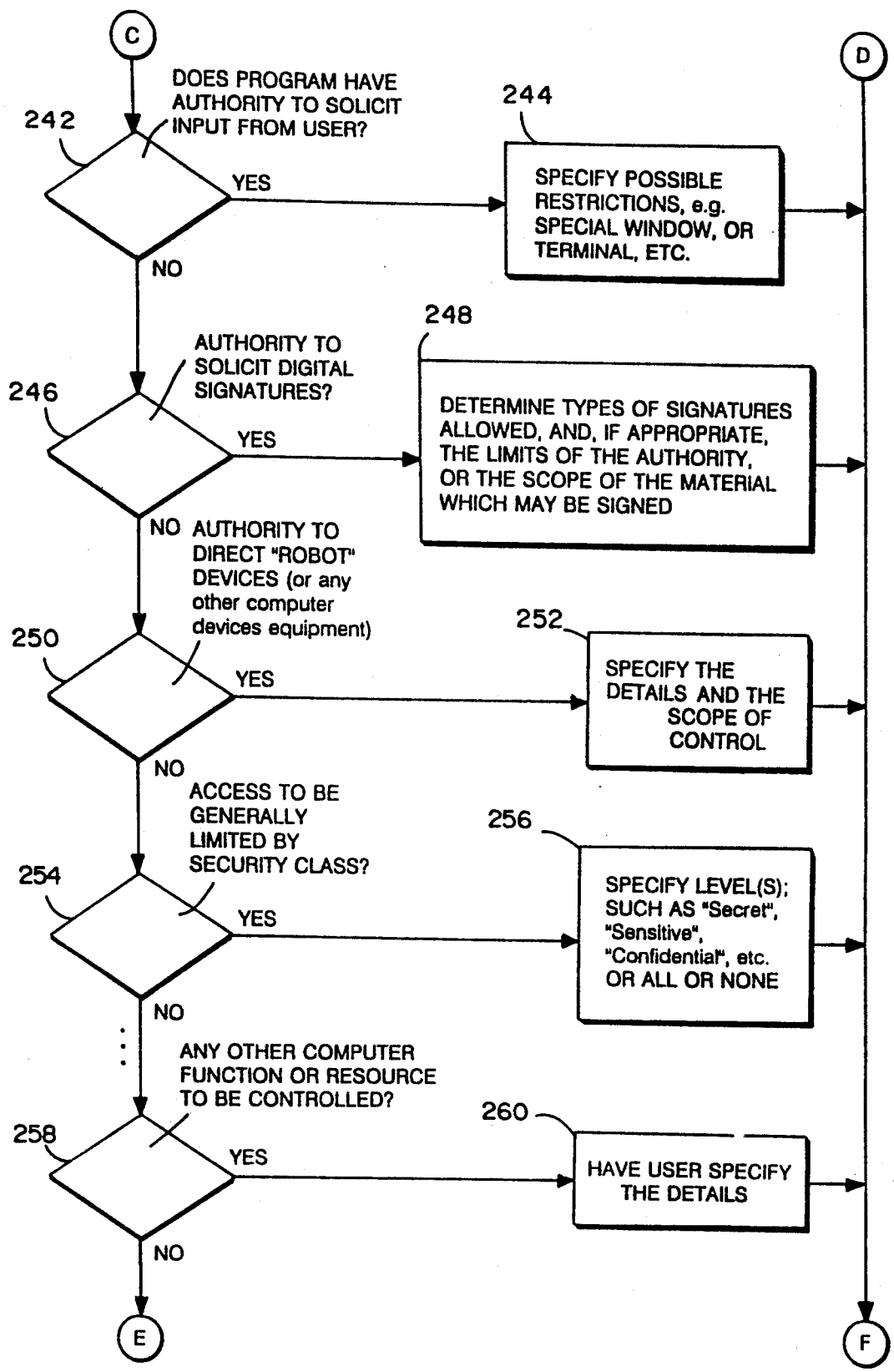

Thereafter, the user will be prompted to specify the type of file access (216). In this regard, the user may specify that the program's authority shall be limited to one or more of: only reading from files, inserting information into files, updating information in files, deleting information from files, erasing files, transmitting a file, etc. If file access or any other authority identified below in FIGS. 6-8 is selected, then an indication of this selection is stored and the routine branches to block 274 of FIG. 9 which will be described below.

If the user did not select file access, then a check is made to determine if this is a request to authorize this program to invoke other programs (218). If so, then a determination is made (221) to ascertain what, if any, limitations or qualifications are to be established on which programs can be invoked. There are many ways that such qualifications could be defined and combined.

For example, it may be that only one particular program name is allowed to be invoked; or perhaps only programs with a name matching a certain ("wild card") pattern may be invoked. Perhaps the criteria would also contain a specification of the library, or set of libraries, in which permissible programs may reside.

Another way of qualifying programs eligible to be called by this program would be to specify that the called program must have no greater authority than the calling program. Alternatively, depending on the authority and need (and on how the system chooses to combine the authority of invoking and invoked programs), it might be appropriate to require the invoked program to have no lesser authority than the invoking program. In fact, as part of this "invocation authority" qualification, it may even be appropriate to specify the method by which authority is to be combined with the called programs (e.g., by using the called program's natural authority, by using the most restrictive authority of the invoked and invoked, etc.).

As used herein, any reference to a qualification or restriction, or limitation or permission of a specified authority is intended to include an entire rule specification set based on any collection of appropriate criteria. The terms "rule", "set of", "qualification", etc., are used in their most general sense, whereby a specification can be determined by any type of rule, or compound set of rules, which can distinguish elements by any attribute, including, without limitation, for example: by direct specification, by indirect specification, by exclusion, by a list, by a "wild card" rule, or any other way which distinguishes elements by any appropriate attribute, method or criteria. Such distinction is intended to encompass specifications that include only a single element, that exclude all elements, or that include all elements. The PAI may, in whole or in part, consist of any number of contiguous or discontiguous segments of data. In an appropriate context, there may be predefined rules which are formulated for that context, which are presumed in the absence of any explicit qualification.

The terms "indicate", "points to", "address of", etc., are generally intended to convey any type of appropriate association, including without limitation for example: direct specification, any type of pointer, reference, association, hash, linking value common identifier, etc.; it may include any level of indirection; it may be explicit, or it may, as appropriate to the context, be implicit in the absence of any explicit association.

The term "limitations" is intended to refer to the general notion of a limit—it frequently is used in the common sense of a "restriction" over normal capability, but it is also intended to reflect situations in which the limit is defined beyond normal capabilities.

The present invention, while it primarily focuses on defining functions which restrict the ability of a program to access resources normally allowed to users, could also, in an appropriate environment, be used to extend the capabilities beyond those normally allowed to a user. Thus, for example, programs whose PAI is signed by an authority recognized by the supervisor, could be allowed to perform extended functions.

While some exemplary rules have been given regarding how the PAI should be verified, the particular implementation could vary widely. As indicated, in some cases the PAI may not need to be signed at all—such as when the user defines the PAI himself, or when a trusted administrator stores the PAI in trusted access controlled storage. When the PAI is signed, there are any number of ways in which signature verification could be accomplished—e.g., in accordance with the inventor's other patents, U.S. Pat. Nos. 4,868,877 and 5,005,200. It is likely that the user will have previously stored information defining the ultimate public key or certificate whose signature the user trusts.

Turning back to FIG. 6, if the user did not select program-invoking permission, then a check is made (220) to determine if this is a request to specify situations in which this program may be invoked. If so, then a determination is made (223) to ascertain limitations or qualifications of such authority. One such specification might be that the program must be invoked directly by the user (and perhaps this would be the default in lieu of any specification); perhaps this program could only be invoked by programs with names from a specific list, or from specific libraries similar to the "invoking authority" described above. Perhaps the program can only be invoked by programs with greater authority, or with lesser authority. Which rule is appropriate may be related to how the underlying system combines PAI authorizations for programs called by other programs. Another aspect of this qualification, may be to specify how the authority of this program is to be combined with the authority of an invoking program—e.g., whether this program's effective authority is restricted by the caller's. Many other possibilities are also available, perhaps even differing for each type of authority.

Turning to FIG. 7, if the authority identified in block 220 was not selected, then a check is made to determine whether the program is to be allowed to generate electronic mail (222). If so, then a check is made as to whether this ability to generate electronic mail is to be qualified, e.g., restricted to certain individuals. If so, such further qualifications are specified by the user (224).

If the authority identified in block 222 is not selected, then the user is asked as to whether the program is to be allowed to transmit data to other users (226). If so, the above-identified processing in block 224 is performed to determine any qualifications to this authority.

If the authority identified in block 226 is not selected, then as indicated in block 228, a check is made to determine whether the program is allowed to perform "document release" operations. If so, then qualifications to this authority may be selected and stored by, for example, determining from the user the class of documents to which the authority applies (e.g., top secret, secret, sensitive, etc.). Alternatively, the documents to be released may not require "release" from a security point of view, but rather may relate to an engineering release of documents. In either event, any selected qualifications are recorded.

If the authority identified in block 228 is not selected, then a check is made to determine if the program is to be allowed to execute machine language programs (232). This authority may be useful to prevent certain routines from inappropriately executing or being executed as a machine language program. The user may be prompted to specify any appropriate qualifications 233. If the authority identified in block 232 is not selected, then a check is made to determine whether the program should be given any special memory access privileges, e.g., access to storage reserved for certain operating system programs (234). If so, then the user will be prompted to specify any qualifications to such access privileges as appropriate.

If the authority identified in block 234 is not selected, then a check is made to determine whether the program should have the authority to display information to the user (238). In this regard, certain programs may be intended solely for the purpose of performing certain calculations. Such a program might be designed such that there should not be any user interaction whatsoever. If such a program were to be tampered with, instructions may have been inserted to create an erroneous message to the user which may cause a security breach. For example, a screen may be displayed to the user that there has been a system failure and that it is necessary for the user to enter his secret password to resume operation. Such a program may automatically transmit the password to a party who will then have access to the password and any other information entered on such a screen.

If a program is given the authority to display information to the user, as indicated in block 240, this authority may be restricted, for example, by only permitting display in a special window, or only on special consoles.

If the authority identified in block 238 was not selected, then a check is made as indicated in the FIG. 8, block 242 as to whether the program is to have the authority to solicit input from the user. If so, then this authority may be qualified by specifying possible restrictions, for example, via soliciting from a special window or terminal, (244).

If the authority identified in block 242 is not selected, then a check is made as to whether the program is to have the authority to solicit digital signatures (246). In this regard, a mischievous program might trick a user by displaying one set of information, but causing the actual digital signature to be applied to an entirely different set of digital material. Thus, by requiring PAI authorization to solicit and/or perform digital signature operations, an unauthorized program is prevented from mimicking the external attributes of an authorized program, but internally applying the user's digital signature capability to fraudulent material.

If the program is authorized to solicit digital signatures, limitations may be placed on this authority as indicated in block 248. Thus, the program may be only allowed to effect digital signatures on material with limited scope, value, authority or other characteristics.

If the authority identified in block 246 is not selected, then a check is made to determine whether a program may have authority to direct robot devices, or any specified computer equipment or computer related devices. If such authority is selected, qualifications may be placed on such authority by specifying the details and scope of control over such equipment (252).

If the authority identified in block 250 is not selected, then a check is made to determine whether access is to be generally limited by security class (254). Thus, certain resources, files, etc. may be associated with a particular security class, such as secret, sensitive, etc. If such authority is to be associated with the program, then restrictions may likewise be specified, including designations of the particular security level (256).

If the authority identified in block 254 is not selected, then a check is made as to whether any other computer function or resources are to be controlled (258). If so, then the user is prompted to specify details as to such other computer functions or resources (260).

If the authority identified in block 258 is not selected, then a check is made to determine whether the user has finished specifying authority (262) as shown in FIG.

9A. If the user has not finished specifying authority, then a message is issued indicating that the user is attempting to specify an unknown authority specified (264) since the array of authority selections has, at this point, been exhausted. The routine then routine branches back to FIG. 6, at entry point G to resume processing at block 210.

If the user has finished specifying authority, as determined in block 262, all previously defined authorizations are collected and the PAI structure shown in FIG. 2 is completed, except for digital signature related entries.

A check is then made in block 268 to determine whether the PAI structure is to be digitally signed. If so, then the appropriate digitally signature operation is performed on the PAI structure, as indicated in block 270. The digital signature may be performed in accordance with the teachings in the inventor's U.S. Pat. Nos. 4,868,877 and 5,005,200 or by using more conventional digital signature and certification techniques as desired. Thereafter, the PAI is stored using, for example, one of the approaches set forth in FIGS. 3A through 3D so that it is associated with its program 272 and the routine is thereafter exited.

Figures 9A, 9B:
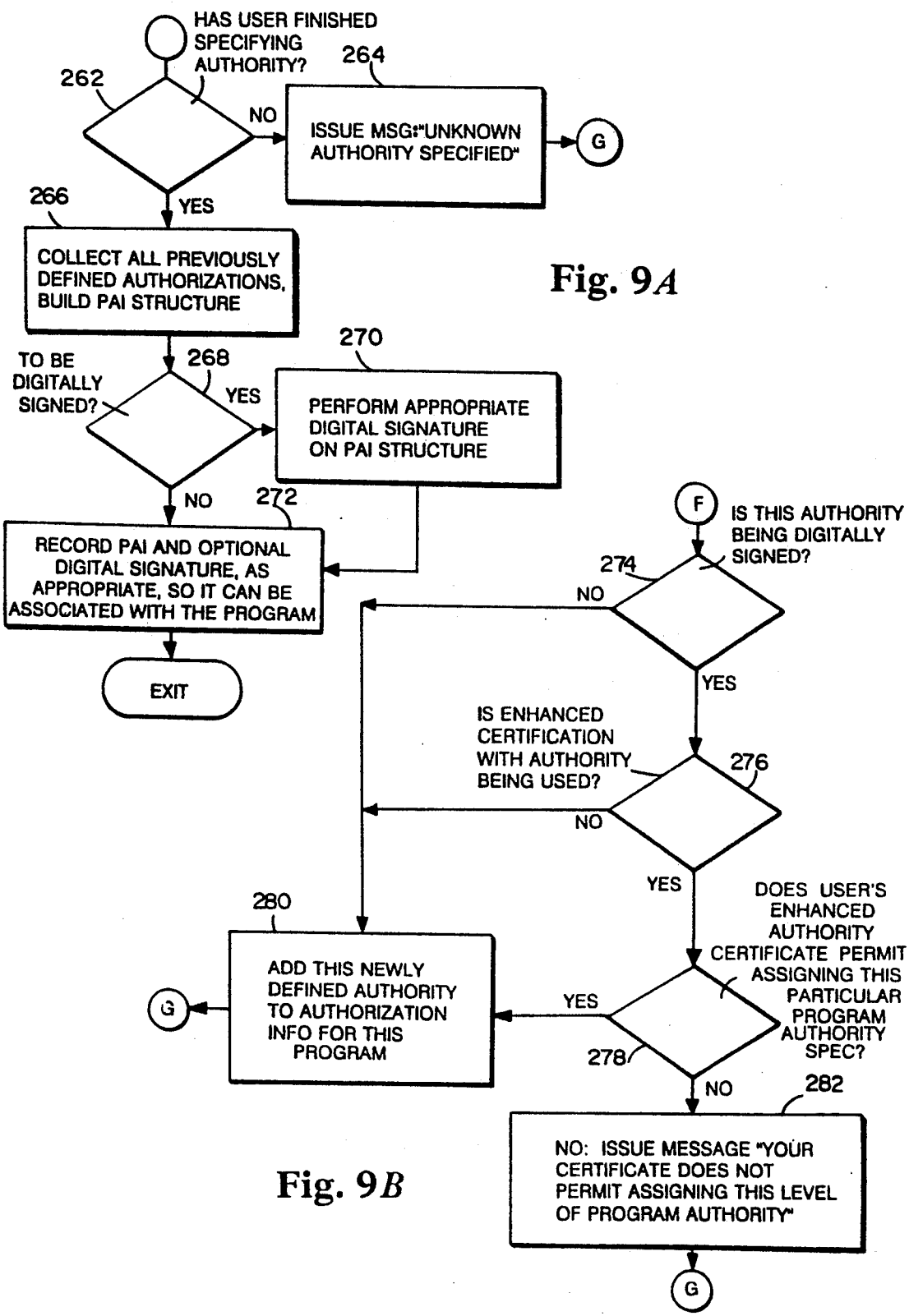

Turning to FIG. 9B, at entry point F, after each of the authorizations described in regard to blocks 212 through 258 have been selected, and an indication of the selection recorded, the routine branches to block 274 to determine whether the authority specification is being digitally signed. If the authority is not being digitally signed, then the newly defined authority is added to the authorization information for the associated program (280) and the routine branches back to block 210 at entry point G in FIG. 6.

If the authority is to be digitally signed, then a check is made as to whether the enhanced certification (with authority) is being used in accordance with the inventor's U.S. Pat. Nos. 4,868,877 and 5,005,200 (276). If no, then the routine branches to block 280 as described above.

If enhanced digital certification is being used, then a check is made to determine whether the user's enhanced authority certificate, as described in the above-identified patents, permits assigning this particular program's authority specification. If the enhanced authority certificate does permit assigning such authority, then the above-identified processing in block 280 is performed. If not, then a message is issued to the user that "Your certificate does not permit assigning this level of program authority" as indicated in block 282. The routine then branches back to FIG. 6 and entry point G for the processing of block 210.

Figure 10:
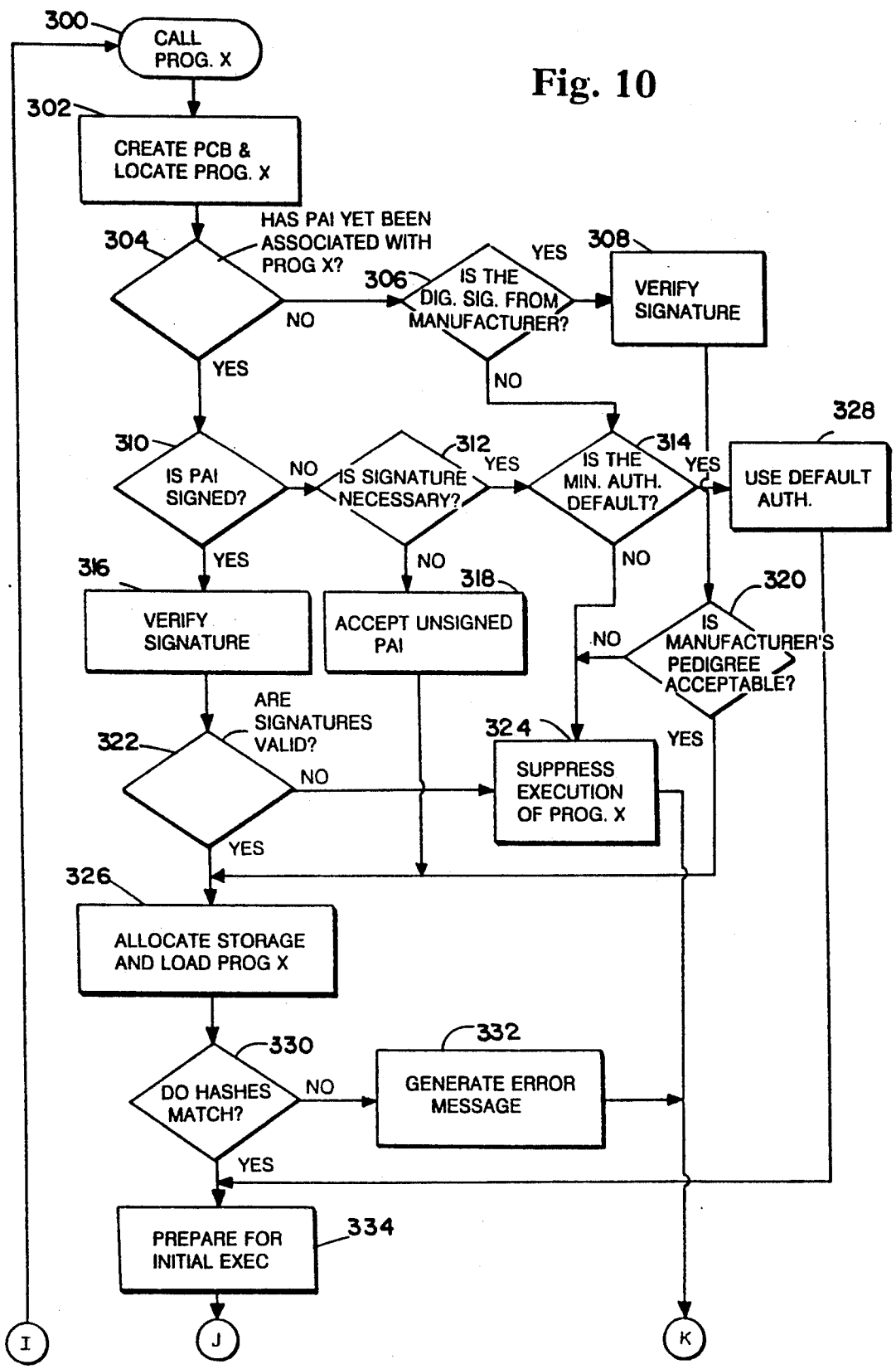
FIGS. 10 and 11 illustrate the sequence of operations performed by a supervisor program in processing program authorization information.
Figure 11:
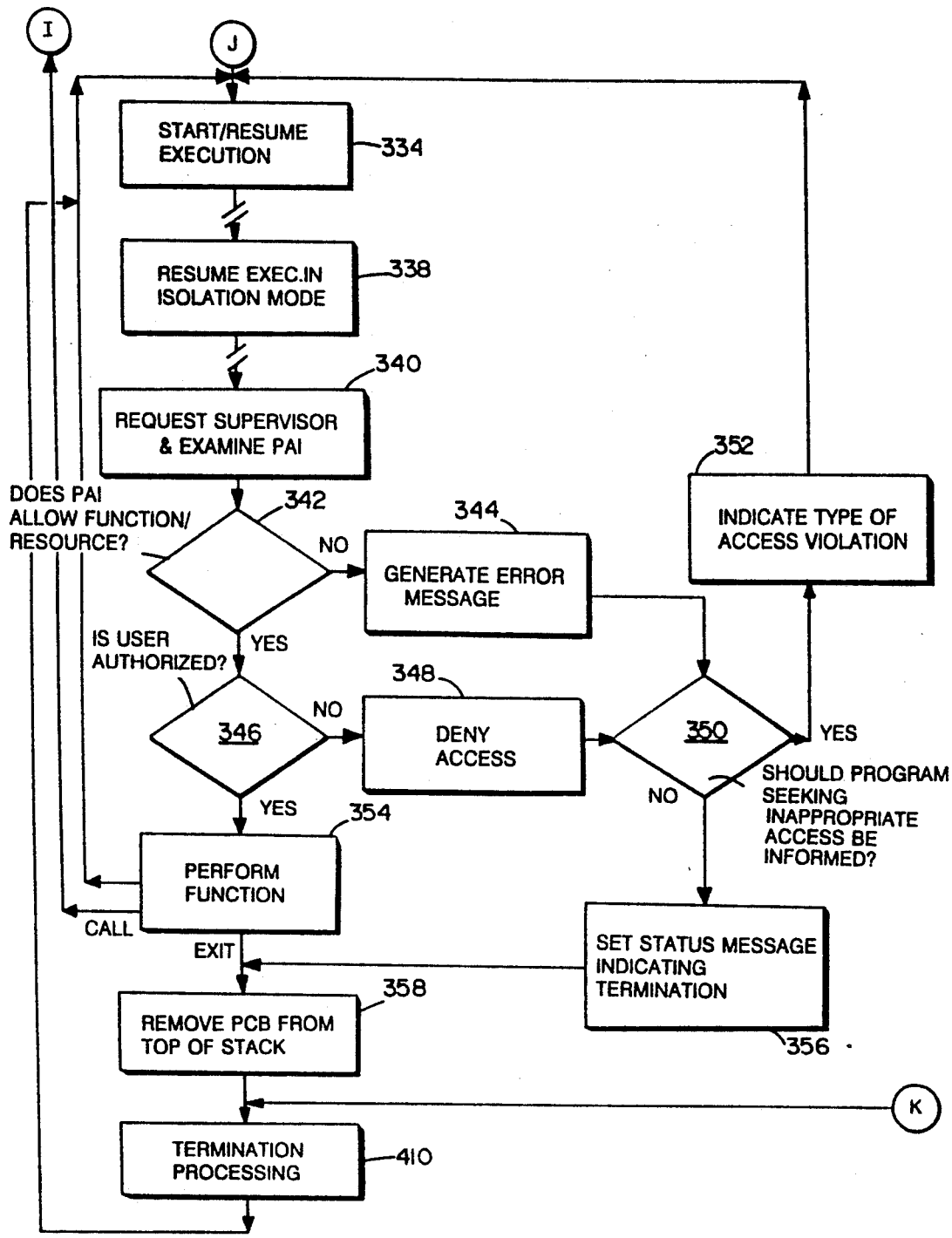

FIGS. 10 and 11 illustrate the sequence of operations of a supervisor program for controlling the processing of a program being executed in accordance with its program authorization information. The processing of a program "X" and its program authorization information illustrated in FIG. 10 is initiated while the computer is executing a supervisor routine. As shown in FIG. 10 at 300, a calling program calls program X for execution. Thereafter, a program control block is created for program X. The program control block created will not be added to the top of the execution stack until it is determined that the program is permitted to be invoked and verification is successful completed. Thus, if the program fails a security check, it will not be placed in the program execution chain. In addition to creating a "tentative" program control block, the called program will be located through an appropriate program directory during the processing in block 302.

Thereafter, a check is made at block 304 to determine whether PAI has yet been associated with program X so as to place program X in the so-called "safety box" described above. This PAI may or may not be signed depending upon its particular application as described above.

If no PAI has yet been associated with the program, then a check is made to determine whether the program has an associated signed "pedigree" from the manufacturer (306). Thus, if a well known manufacturer of programs has signed the program with a public key or digital certificate, then, if desired, such a program may be assigned whatever level of authority desired depending upon how much the manufacturer is trusted and the system may permit execution of such program. Such a digital signature from the manufacturer can be used to verify that the associated program had not been infected with a virus since it can be determined whether or not the program is exactly the same as it was when it was generated by the manufacturer.

If the check in block 306 indicates that there is a digital signature from the manufacturer in block 308, the manufacturer's "pedigree" will be verified by verifying the digital signature and performing whatever certification and authorization checks are appropriate, given the trust criteria which has previously been established by the user (and signed by a manufacturer in which the user has previously established trust). Mechanisms for performing digital signatures which delegate authority are specified in detail in the inventor's U.S. Pat. Nos. 4,868,877 and 5,005,200, which patents have been expressly incorporated herein by reference.

Depending upon the outcome of verification operations in block 308, a decision is made in block 320 as to whether the manufacturer's pedigree is acceptable. If the manufacturer's pedigree is acceptable, the routine branches to block 324 where the execution of the program is suppressed, as will be explained further below.

If the manufacturer's pedigree is acceptable, then the routine branches to block 326 where storage is allocated for the program and the program is loaded in a manner to be described in detail below.

As indicated at block 310, if it is determined that a PAI has been associated with program X, a check is made to determine whether the PAI is signed. If the PAI is signed, then as indicated at block 316, the signatures are verified. In the presently preferred embodiment, signatures are verified through a certificate heirarchy. The preferred methodology for determining whether the signatures are valid and whether they are trusted by the caller and whether the authority delegated by the program is permitted to have been delegated by the signer is taught in the inventor's U.S. Pat. Nos. 4,868,877 and 5,005,200. As indicated in these patents, the trust level may be determined by which high level public keys, and/or metacertifiers have been specified as trusted by the user. Alternatively, more conventional digital signature techniques may be employed.

Depending upon the processing in block 316, a decision is made in block 322 whether the signatures are valid, authorized and trusted. If the signatures are not determined to be valid, then the routine branches to block 324 where the execution in program X is suppressed.

If the check in block 310 reveals that the PAI is not signed, then a further check is determined at 312 as to whether the particular system or application demands that the PAI be signed (312). If, for example, a user generated program is being executed for the user's own use, then no signature may be necessary since the program is not being distributed and the user trusts what he has done. If it is determined in block 312 that no digital signature was necessary, then block 318 would accept and use the unsigned PAI and storage would be allocated and the program X would be loaded (326).

If it is determined that a digital signature is necessary at block 312, then a check is made at block 314 as to whether the system has a "minimal" authority default for programs that have no explicit PAI or an unsigned PAI. Thus, for example, the system may permit a program to run under a minimum authority default as long as it does not attempt to modify any permanent file. If there is no minimum authority default, then the execution of the program is suppressed (324). In the process of suppressing the execution of the program, an error code or message will be returned to the calling program. For example, a message may be displayed to the calling program that "program X does not have valid, signed authorization." The routine then branches to block 410 which operate to actually suppress the execution as will be explained further below.

If the processing in blocks 322 and 316 reveal that the signatures are valid, then the processing in block 326 is performed. Initially, storage is allocated for the program. The program may or may not be loaded into memory which only the supervisor is allowed to alter depending upon the constraints built into the computer system and the nature of the program. If the program modifies itself, then it cannot be loaded into memory which only the supervisor is allowed to alter.

Thereafter, the program X's program authorizing information is combined, as appropriate, with the PAI associated with the PCB of the calling program, if any. This combined PAI, which may include multiple PAI's, is then stored in an area of storage which cannot generally be modified by the program and the address of the PAI is stored in the process control block (PCB) as indicated in field 156 of FIG. 5. Thus, if program X is called by a calling program, it is subject to all its own constraints as well as being combined in some way with the constraints of the calling program, which aggregate constraints are embodied into program X's PAI. In this fashion, a calling program may not be permitted to exceed its assigned bounds by merely calling another program. There are many alternative ways that a program's PAI could be combined with the PAI of the program which invokes it—depending on the strategies which are applicable to the current environment, and the inherent nature of the programs themselves. It may even be likely that even the method of combination is itself one of the PAI authorities, or qualifiers, of either or both the invoking or invoked program.

For example, it is reasonable to restrict a called program to the lesser of its "normal" PAI authority and that of its calling program—to insure the calling program cannot mischievously misuse the called program's greater authority to circumvent its own limitations.

On the other hand, for called programs which carefully verify their own actions, it could be possible to allow the called program greater inherent authority than the program which calls it—this way sensitive resources could be made available to wider use by mediating such use through trusted sub-programs. The possibilities for such combination must be carefully considered, not only by the designers of the underlying control system, but also by those who assign authority to each program. Thereafter, the program is loaded and the hash of the program is computed based on the algorithm specified in the program's PAI.

Turning back to block 314, if it is determined that the system has a minimum authority default, then as indicated at block 328, the minimum default authority is used. Such minimum default authority is combined as appropriate with the PAI of the calling program, if any, and inserted into the new PCB as explained above in conjunction with block 326. The storage for the PAI is allocated from memory that the program generally cannot alter. Thereafter, the storage is allocated for the program as explained above in conjunction with block 326 and the address is saved in the PCB. The processing in block 328 using the default authority does not involve computing a hash of the program and the routine branches to block 334 to prepare for program execution.

Turning to block 330, a check is made to determine whether the computed program hash in block 326 agrees the hash stored in the PAI. If the hashes do not match, then the routine branches to block 332 in which an error message is forwarded to the calling program such as "program X has been altered or damaged" and the routine branches to block 410 to suppress execution of the program.

In block 334, the program is prepared for initial execution, after it has been determined that the hashes match or after the processing in block 328. The preparation for initial execution includes setting initial status and "resume" information in the program's PCB so that the program will start at the proper entry point. Additionally, the program's PCB will be placed on the top of the execution stack.

Turning to FIG. 11, in block 336 the execution of the current program either starts or resumes execution upon being placed on top of the execution stack. The processing which occurs in blocks 336 through 410 includes operations which are conventionally preformed to execute a program. Processing operations will now be described with emphasis on those operations involving PAI processing. In block 336, the supervisor prepares to continue a program at a saved "resume" point by reloading (or loading) the state of various registers to reflect their state at the point in time when the program was last interrupted (or initialized). Additionally, system status information is restored, e.g., such as stack pointers, etc., depending upon the particular system environment being utilized.

After the processing in block 336, if an application program is being executed, then the system switches from a "supervisor" mode to a "isolation" mode so that the program resumes execution in the isolation mode (338). In the isolation mode, the program is unable to affect computer resources except through protected supervisor calls which switch the computer back to the "supervisor" mode (it is noted that in certain cases and in certain environments, it may be possible that the program is designed and required to run in a "supervisor" mode. In this case, provided the program is properly authorized as defined in its PAI, it will at some point use a "supervisor" function to set the status in its PCB to enable "supervisor" state operation. In such case, it would be appropriate to check that status and if set, to give control to the program supervisor state.).

In block 340, it is presumed that the program has requested a controlled "supervisor" function. Under such circumstances the computer switches, e.g., by setting a predetermined status word, to the "supervisor" mode and passes control to a protected system monitor interrupt routine. The program's resume position is saved in the program's PCB and other appropriate system status is saved in the PCB. Afterwards the function and resources to be accessed are determined and the nature of the access, e.g., to read, to modify, and delete, etc.

Additionally, in block 340, an examination is made of the PAI information stored in the process control block. As a follow up to, or associated with, the processing in block 340, a check is made in block 342 to determine whether the examined PAI is allowed access to the required resources or allowed to perform the required functions. For example, if an attempt is made to use electronic mail, a check is made of the PAI to determine whether the program is authorized to perform electronic mail functions and if so whether the mailing is limited to a set of mail identifiers.

If the check at 342 reveals that the PAI does not allow the attempted function or resource access, then a error message is generated in block 344 to indicate that the program is attempting to exceed its limits, access to the resource or function is denied and an appropriate error code or message is generated. A check is then made in block 350 to determine whether the program attempting to achieve access should be informed that it has been denied access (350). If the check in block 350 reveals that the program should be so informed, then in block 352, the program is allowed to resume execution with a message indicating the type of access violation that caused the request to fail and be suppressed. The routine then branches back to block 336 for resuming execution of the program. Under such circumstances, the program may be informed, for example, that its PAI is only authorized to read authority for a particular file whereas an attempt was made to write to that file. If the check at block 350 indicates that the calling program should not be informed, then appropriate status and related messages (for the calling program) are generated indicating termination due to an unspecified access violation 356.

If the check in block 342 reveals that the PAI does allow access to the function or resource, then a check is made in block 346 to apply conventional access controls to ensure that the user of the program is still within the bounds of his authority. This check ensures that the function or resource request is within the scope of that allowed by the system for this particular user. Thus, while a PAI may allow a program to access a certain class of files, it may be that the security level associated with a particular user may not allow that user access to such files. Block 346 applies conventional security techniques to protect the system from a user who is not properly authorized. This check may, for example, be based upon a user identification code initially entered into the system upon sign-on. As indicated at block 348, if the user was not authorized, then access is denied since the program is attempting to violate the user's access capability and appropriate error codes/messages are generated. Thereafter, the processing explained above with respect to block 350 and 352 is initiated.

If the user is authorized as determined by the processing in block 346, then the function is performed as indicated in block 354. If the function is a program exit, then the routine exits the program via block 358, where the associated PCB is removed from the top of the execution stack.

Further termination processing is performed in block 410, where any stray storage and resources that were accumulated during the execution of the program are released, including as necessary, the storage assigned to program X and its PAI storage. The PCB and all associated storage are released and final status information including error codes and messages, as appropriate are presented to the program's caller. Thereafter the routine branches back to block 336 to resume the calling program.

Finally, turning back to block 354, if a program call is the function to be performed, then the routine branches to block 300 in FIG. 10 to call the appropriate program.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a computer system including processing means for executing a plurality of programs and memory means coupled to said processing means for storing data and for storing at least one program, said computer system having a plurality of computer resources and being capable of performing a wide range of information processing related functions under program control, a method for protecting a computer user from operations typically performable by a program while it is executing on behalf of a user, comprising the steps of:

establishing a program authorizing information data structure for storing a plurality of authorization entries each indicating at least one of those computer resources and information processing related functions which may be used by an associated program;

storing said program authorizing information data structure; and associating the program authorizing information data structure with at least one program to be executed by said computer system to thereby protect the computer user from operations that might be performed by said at least one program, whereby the program authorizing information is available to be monitored when its associated program is executed.

2. A method according to claim 1, further including the step of including a digital hash of said program to be executed as part of the program authorization information data structure.

3. A method according to claim 1, further including the step of digitally signing at least a part of the program authorization information data structure with the private key of an authorizing entity.

4. A method according to claim 3, wherein the digitally signing step includes indicating that a plurality of digital signatures are required in order for any digital signature to be valid.

5. A method according to claim 3, wherein the digitally signing step includes the step of indicating at least one qualification of authority which has been granted to the signer.

6. A method according to claim 1, wherein the program authorization information data structure is defined by a computer user before an associated program is executed.

7. A method according to claim 1, wherein the step of establishing provides an indication of at least a part of at least one data file to which the program may have access.

8. A method according to claim 7, wherein the indication of at least one data file includes an indication of the file by designating a portion of the file name.

9. A method according to claim 8, wherein said indication of the file by designating a portion of the file name, operates to define a set of files.

10. A method according to claim 1, wherein the step of establishing provides an indication of at least a subset of at least one file to which a program to be executed has access.

11. A method according to claim 1, wherein the step of establishing associates a set of files to which a program to be executed has access.

12. A method according to claim 1, wherein the step of establishing provides an indication of at least a subset of at least one file to which the program does not have access.

13. A method according to claim 1, wherein the step of establishing associates at least one file to which a program to be executed has access and indicates the ability to read information from said file.

14. A method according to claim 1, wherein the step of establishing associates at least part of one file to which a program to be executed has access and indicates the limitations in the ability to use said part.

15. A method according to claim 1, wherein the step of establishing provides an indication of at least one file to which a program to be executed has access and specifies the ability to write information in said at least one file.

16. A method according to claim 1, wherein the step of establishing provides an indication of the set of programs which are authorized to be invoked by said program.

17. A method according to claim 1, wherein the step of establishing associates the ability to invoke other programs which may have different authorizing information than the associated program with said associated program.

18. A method according to claim 1, wherein the step of establishing provides as indication of denying said associated program the ability to invoke other programs having different program authorizing information.

19. A method according to claim 1, wherein the establishing step provides an indication of the ability to invoke other programs restricted only by the limits of the calling program.

20. A method in accordance with claim 16, wherein the associated program authorizing information limits the effective program authorization of an invoked program by the combination of its own program authorizing information and that of the calling program.

21. A method according to claim 1, wherein the step of establishing associates an indication of the set of programs which are authorized to invoke said program.

22. A method according to claim 1, further including the step of limiting, using said stored program authorizing information associated with a program to be executed, the use of at least one of the resources and functions which would otherwise be available to said program.

23. A method according to claim 22, wherein the step of limiting includes limiting the resources and functions which are available to other programs which are invoked by the program which is being executed.

24. A method according to claim 1, wherein the step of establishing provides an indication of at least one rule governing the authority of said associated program to transmit information.

25. A method according to claim 24, wherein said at least one rule provides an indication of the authority to transmit information and the step of establishing includes the step of defining the ability to utilize electronic mail.

26. A method according to claim 24, wherein said at least one rule provides an indication of the authority to transmit information and the step of establishing includes the step of indicating a subset of all possible recipients.

27. A method according to claim 1, wherein the step of establishing provides at least one rule governing the program's ability to solicit digital signatures on behalf of the user.

28. A method according to claim 1, wherein the step of establishing provides at least one rule governing the program's ability to create digital signatures.

29. A method according to claim 28, wherein said at least one rule governs the ability to solicit digital signatures by defining the type of material to which the digital signature can be applied.

30. A method according to claim 28, wherein said at least one rule limits the information which may digitally signed to those involving a predetermined maximum amount of money value.

31. A method according to claim 1, wherein the step of establishing qualifies the ability of other programs to perform document release operations on behalf of the user.

32. A method according to claim 1, wherein at least one rule qualifies program operation to a subset of possible security classifications.

33. A method according to claim 1, wherein the step of establishing provides a qualification of the ability of said associated program to execute machine language instructions.

34. A method according to claim 1, wherein the step of establishing qualifies the set of memory which the said associated program is permitted to access.

35. A method according to claim 34, wherein the permission to access includes the ability to alter.

36. A method according to claim 34, further including indicating that a particular class of memory is alterable.

37. A method according to claim 1, wherein the step of establishing provides an indication of the set of qualifications governing the ability of a program to display information to the user.

38. A method according to claim 1, wherein the step of establishing provides an indication of the set of qualifications governing the ability of the program to solicit information from a user.

39. A method according to claim 1, wherein the step of establishing provides an indication of the set of qualifications governing the ability of a program to control computer controlled resources which are coupled to the computer.

40. A method according to claim 39, wherein said computer controlled resources includes robot apparatus.

41. A method according to claim 39, wherein the set of qualifications governs the ability of the program to transmit information via a modem.

42. In a computer system having means for executing a plurality of programs and a memory means coupled to said means for executing, for storing data and program instructions, said computer system being capable of performing a wide range of information processing related operations under program control, a method for executing programs by said means for executing for a computer user comprising the steps of:
- identifying a program to be executed;
- determining whether a program authorizing information data structure has been associated with the program, wherein said program authorizing information qualifies the ability of the program from performing information processing related operations which are available to said computer user;
- examining said program authorizing information data structure if one has been associated with said program;
- determining from an examination of said program authorization information whether the associated program is allowed to perform an attempted information processing related operation; and
- suppressing performance of said operation if said program authorizing information data structure indicates that said program is not allowed to perform an attempted operation.

43. A method according to claim 42, further including the step of checking said authorization information prior to permitting said program to utilize a required computer system resource.

44. A method according to claim 42, further including the step of checking whether said program authorization information data structure allows the performance of an operation defined in said associated program.

45. A method according to claim 42, further including the step of checking to determine whether a user has been assigned the authority to run programs performing a predetermined operation.

46. A method according to claim 42, further including the step of creating a program control data structure for said program and storing authorizing information related indicia in said program control data structure.

47. A method according to claim 46, wherein said authorizing information related indicia is a pointer to said authorizing information.

48. A method according to claim 42, further including the step of assigning a default program authorization information if said determining step reveals that no valid authorizing information has been associated with said program.

49. A method according to claim 42, further including the step of verifying any digital signature associated with said program authorization information data structure.

50. A method according to claim 49, including the step of suppressing the execution of said program if said digital signature is not valid.

51. A method according to claim 49, further including the step of allocating storage for said program if said digital signature is valid.

52. A method according to claim 42, further including the step of combining the authorizing information of said program with the authorizing information associated with a routine calling said program.

53. A method according to claim 42, wherein said authorizing information data structure includes means for storing a hash of said program, and further including the step of computing the hash of said program and comparing the computed hash with said stored hash.

54. A method according to claim 42, further including the step of verifying the authority associated with the signer of a digital signature.

55. A method according to claim 42, further including the step of combining the authorizing information of said program with the authorizing information associated with a routine called by said program.

56. A method according to claim 42, wherein said authorization information includes an indication of the set of data to which said associated program has authority to access.

57. A method according to claim 42, wherein said authorization information includes an indication of the set of fields of at least one file to which said associated program has the authority to access.

58. A method according to claim 42, wherein said authorization information includes an indication of the set of data to which said associated program has the authority to access and the nature of the operations on said data which the program is permitted to perform.

59. A method according to claim 42, wherein said authorization information includes an indication of the set of data to which said associated program has authority to read.

60. A method according to claim 42, wherein said authorization information includes an indication of the set of data to which said associated program has authority to process.

61. A method according to claim 42, wherein said authorization information includes an indication of the set of data to which said associated program has authority to modify.

62. A method according to claim 42, wherein said authorization information includes an indication of the set of data to which said associated program has authority to erase.

63. A method according to claim 42, wherein said authorization information includes an indication of the set of data to which said associated program has authority to transmit.

64. A method according to claim 42, wherein said authorization information includes an indication of whether said associated program has the ability to call programs.

65. A method according to claim 42, wherein said authorization information includes an indication of the set of programs which are allowed to invoke said associated program.

66. A method according to claim 42, wherein said authorization information includes an indication of at least one rule governing the authority of the associated program to generate electronic mail.

67. A method according to claim 42, wherein said authorization information includes an indication of at least one rule governing the authority of said said associated program to transmit data to other users.

68. A method according to claim 42, wherein said authorization information includes an indication of the ability of the associated program to perform document release.

69. A method according to claim 42, wherein said authorization information includes an indication of at least one rule governing the authority of said associated program to execute machine language programs.

70. A method according to claim 42, wherein said authorization information includes an indication of at least one rule governing the authority of said associated program to access memory.

71. A method according to claim 42, wherein said authorization information includes as indication of at least one rule governing the authority of said associated program to display information to a user.

72. A method according to claim 42, wherein said authorization information includes an indication of at least one rule governing the authority of said associated program to solicit input from a user.

73. A method according to claim 42, wherein said authorization information includes an indication of at least one rule governing the authority of said associated program to create digital signatures.

74. A method according to claim 42, wherein said authorization information includes an indication of at least one rule governing the authority of said associated program to control other devices.

75. A method according to claim 74, wherein said other devices includes robot devices.

76. A method according to claim 42, wherein said authorization information includes an indication of at least one rule indicating that access is governed by a security clearance.

77. A method according to claim 42, wherein said authorization information is included as part of a digital signature.

* * * * *